US006985270B1

(12) United States Patent
Keech et al.

(10) Patent No.: US 6,985,270 B1
(45) Date of Patent: Jan. 10, 2006

(54) METHOD AND PHOTOGRAPHIC ELEMENT FOR CALIBRATING DIGITAL IMAGES

(75) Inventors: John T. Keech, Penfield, NY (US); John P. Spence, Webster, NY (US); Mark E. Shafer, Fairport, NY (US); Donald O. Bigelow, Webster, NY (US)

(73) Assignee: Eastman Kodak Company, Rochester, NY (US)

(*) Notice: Subject to any disclaimer, the term of this patent is extended or adjusted under 35 U.S.C. 154(b) by 1133 days.

(21) Appl. No.: 09/635,600

(22) Filed: Aug. 9, 2000

(51) Int. Cl.
*H04N 1/46* (2006.01)

(52) U.S. Cl. ...................... 358/504; 358/527; 358/406; 358/1.2; 382/194; 382/199; 430/496; 430/359

(58) Field of Classification Search ................ 358/504, 358/527, 406, 506, 302, 1.2; 382/194, 199, 382/221, 162, 166, 130; 430/496, 359
See application file for complete search history.

(56) References Cited

U.S. PATENT DOCUMENTS

| | | | |
|---|---|---|---|
| 3,718,074 A | | 2/1973 | Davis |
| 4,211,558 A | | 7/1980 | Oguchi et al. |
| 4,260,245 A | | 4/1981 | Hujer |
| 4,274,732 A | | 6/1981 | Thurm et al. |
| 4,365,882 A | | 12/1982 | Disbrow |
| 4,464,045 A | | 8/1984 | Findeis et al. |
| 4,577,961 A | | 3/1986 | Terashita |
| 4,634,850 A | | 1/1987 | Pierce et al. |
| 4,666,307 A | * | 5/1987 | Matsumoto et al. ........ 356/404 |
| 4,786,792 A | | 11/1988 | Pierce et al. |
| 4,874,936 A | | 10/1989 | Chandler et al. |
| 4,881,095 A | | 11/1989 | Shidara |
| 4,884,102 A | | 11/1989 | Terashita |
| 4,939,354 A | * | 7/1990 | Priddy et al. ............... 235/456 |
| 4,977,521 A | * | 12/1990 | Kaplan ....................... 382/254 |
| 5,075,716 A | | 12/1991 | Jehan et al. |
| 5,157,506 A | * | 10/1992 | Hannah ...................... 382/167 |
| 5,189,521 A | | 2/1993 | Ohtsubo et al. |
| 5,198,907 A | | 3/1993 | Walker et al. |
| 5,267,030 A | * | 11/1993 | Giorgianni et al. ......... 358/527 |
| 5,319,408 A | | 6/1994 | Shiota |
| 5,452,055 A | | 9/1995 | Smart |
| 5,519,510 A | | 5/1996 | Edgar |

(Continued)

FOREIGN PATENT DOCUMENTS

EP 0762201 A1 3/1997

(Continued)

OTHER PUBLICATIONS

U.S. Provisional Appl. No. 60/211,058 filed Jun. 3, 2000 by Levy et al.

(Continued)

*Primary Examiner*—Kimberly Williams
*Assistant Examiner*—Negussie Worku
(74) *Attorney, Agent, or Firm*—Paul A. Leipold

(57) ABSTRACT

A method of calibrating digital images having pixels with pixel values includes the steps of: exposing a photographic element to form a latent image of a reference calibration target including a plurality of reference calibration patches; exposing the photographic element to form a latent image of a scene; processing the photographic element to form developed images from the latent images on the photographic element; scanning the developed images to produce digital images; measuring the pixel values of the digital image of the reference calibration target to produce a measured value for each of the reference calibration patches; obtaining an aim value and adjustment data corresponding to each reference calibration patch; generating image calibration corrections using the measured values, the aim values, and the adjustment data; and applying the image calibration corrections to the digital image of the scene.

100 Claims, 4 Drawing Sheets

U.S. PATENT DOCUMENTS

| | | | | |
|---|---|---|---|---|
| 5,591,956 | A | 1/1997 | Longacre, Jr. et al. | |
| 5,649,260 | A | 7/1997 | Wheeler et al. | |
| 5,667,944 | A * | 9/1997 | Reem et al. | 430/359 |
| 5,698,382 | A | 12/1997 | Nakahanada et al. | |
| 5,736,996 | A | 4/1998 | Takada et al. | |
| 5,758,223 | A | 5/1998 | Kobayashi et al. | |
| 5,767,983 | A | 6/1998 | Terashita | |
| 5,832,328 | A | 11/1998 | Ueda | |
| 5,988,896 | A | 11/1999 | Edgar | |
| 6,407,767 | B1 * | 6/2002 | Klees et al. | 347/241 |

FOREIGN PATENT DOCUMENTS

| | | |
|---|---|---|
| EP | 0926550 A1 | 6/1999 |
| JP | HEI 11-316448 | 11/1999 |
| WO | WO 90/04213 | 4/1990 |

OTHER PUBLICATIONS

U.S. Provisional Appl. No. 60/211,446 filed Jun. 3, 2000 by Irving et al.

U.S. Provisional Appl. No. 60/211,065 filed Jun. 3, 2000 by Irving et al.

U.S. Provisional Appl. No. 60/211,079 filed Jun. 3, 2000 by Irving et al.

U.S. Appl. No. 09/635,389 filed Aug. 9, 2000 by Bigelow et al.

U.S. Appl. No. 09/635,257 filed Aug. 9, 2000 by Keech et al.

U.S. Appl. No. 09/635,178 filed Aug. 9, 2000 by Cahill et al.

U.S. Appl. No. 09/635,496 filed Aug. 9, 2000 by Keech et al.

U.S. Appl. No. 09/635,179 filed Aug. 9, 2000 by Keech et al.

U.S. Appl. No. 09/636,058 filed Aug. 9, 2000 by Keech et al.

System Specifications for the Advanced Photo System, APS Redbook, Eastman Kodak Company.

* cited by examiner

METHOD AND PHOTOGRAPHIC ELEMENT FOR CALIBRATING DIGITAL IMAGES

FIELD OF THE INVENTION

The present invention relates to photography and more particularly to use of reference calibration patches in photofinishing.

BACKGROUND OF THE INVENTION

The use of reference calibration patches exposed on a roll of film to enable better exposure control during optical printing is known in the art. See for example U.S. Pat. No. 5,767,983 issued Jun. 16, 1998 to Terashita. The use of reference calibration patches has also been shown to be useful in determining correction values for scanned film data used in digital printing. See for example U.S. Pat. No. 5,667,944 issued Sep. 16, 1997 to Reem et al.; and U.S. Pat. No. 5,649,260, issued Jul. 15, 1997 to Wheeler et al. The use of reference calibration patches has been shown to be used for adjusting optical printing control for making colored copies or prints (U.S. Pat. No. 5,767,983 issued Jun. 16, 1998 to Terashita; U.S. Pat. No. 4,577,961 issued Mar. 25, 1986 to Terashita; U.S. Pat. No. 4,211,558 issued Jul. 8, 1980 to Oguchi et al.; and U.S. Pat. No. 4,884,102 issued Nov. 28, 1989 to Terashita). The use of reference calibration patches has been shown for creating transforms for calibrating exposure (U.S. Pat. No. 5,267,030 issued Nov. 30, 1993 to Giorgianni et al.).

Reference calibration patches have been shown to be recorded in a camera (U.S. Pat. No. 3,718,074 issued Feb. 27, 1973 to Davis; U.S. Pat. No. 4,365,882 issued Dec. 28, 1982 to Disbrow). Reference calibration patches have been shown to be recorded on separate apparatus devices (U.S. Pat. No. 4,260,245 issued Apr. 7, 1981 to Hujer; U.S. Pat. No. 5,452,055 issued Sep. 19, 1995 to Smart; U.S. Pat. No. 5,075,716 issued Dec. 24, 1991 to Jehan et al.). Reference calibration patches have been shown to be recorded on a photofinishing device (U.S. Pat. No. 4,881,095 issued Nov. 14, 1989 to Shidara; U.S. Pat. No. 4,464,045 issued Aug. 7, 1984 to Findeis et al.; U.S. Pat. No. 4,274,732 issued Jun. 23, 1981 to Thurm et al.; U.S. Pat. No. 5,649,260 issued Jul. 15, 1997 to Wheeler et al.; U.S. Pat. No. 5,319,408 issued Jun. 7, 1994 to Shiota).

Barcode data relating to film type and frame number is encoded on the edge of filmstrips for use in photofinishing. For example, the film format known as the Advanced Photo System (APS) as designated in the System Specifications for the Advanced Photo System, referred to as the APS Redbook available from Eastman Kodak Company, reserves specific areas on an APS format film strip to contain latent image barcode information. In particular, a lot number is available for use by a filmstrip manufacturer to encode 27 bits of digital information as described in section 8.2.4 and shown in FIGS. 100-2, 210-1, 210-4-N and 210-4-R in the APS Redbook. Optical storage and retrieval of data written in a rectangular grid aligned with the length of the medium for scanning by a linear CCD array has been disclosed in U.S. Pat. No. 4,786,792 issued to Pierce, et. al. on Nov. 22, 1988 and U.S. Pat. No. 4,634,850 issued to Pierce, et. al. on Jan. 6, 1987. Use of two-dimensional barcode symbols to store data is well known in the prior art and many such symbologies have been standardized by national and international standards organizations. For example, the Data Matrix symbology, disclosed in U.S. Pat. No. 4,939,354 issued Jul. 3, 1990 to Priddy et al., is the subject of the standards ANSI/AIM BC-11-1997 and ISO/IEC 16022:2000. A second such example, the MaxiCode symbology, disclosed in U.S. Pat. No. 4,874,936 issued Oct. 17, 1989 to Chandler et al. is the subject of the standards ANSI/AIM BC-10-1997 and ISO/IEC 16023:2000. A third such example, the Aztec Code symbology, disclosed in U.S. Pat. No. 5,591,956 issued Jan. 7, 1997 to Longacre et al., is the subject of the standard ANSI/AIM BC-13-1998. Software used to locate, decode, and detect and correct errors in symbols in a digital image file is readily available. For example, software for locating and decoding the Data Matrix and MaxiCode symbology is available as the SwiftDecoder™ software product from Omniplanar Inc., Princeton, N.J. Finally, the required scanning and digitization equipment needed to obtain digital image files from a photographic element is readily available in the photofinishing industry.

In the prior art, reference calibration patch data is matched with predetermined aim data and used to make varying levels of corrections to raise image quality. As used herein, the operation referred to as calibration includes making corrections to digital images based on measurement data obtained from reference calibration patches recorded on a photographic element and associated aim values for the photographic element. In order to carry out such a calibration, it is necessary to expose the reference patches with essentially the same exposure levels assumed in the aim. We have found that when a number of exposure devices are used to apply reference calibration patches, for example on different media manufacturing lines, it is necessary to have very exacting device to device exposure control to minimize device to device variations in reference calibration patch exposures on the photographic elements. The requirements are so demanding, that it is prohibitive to set up and keep a number of such exposure devices adequately calibrated.

Reference calibration patch exposures made at a time that differs greatly from the times at which scenes are exposed onto various locations (called frames) on the photographic element will not accurately reflect any changes in imaging characteristics of the photographic element as the element ages before exposure, referred to as raw stock keeping, or as any latent image formed by exposure ages after exposure, referred to as latent image keeping. Exposures made on a photographic element in manufacturing have shorter raw stock keeping and longer latent image keeping than images of scenes. Exposures made on a photographic element just prior to processing have longer raw stock keeping and shorter latent image keeping than images of scenes. Processing may occur at any time after exposure, so variation in latent image keeping of reference calibration patches and images of scenes naturally occurs. Exposures may occur at any time after manufacturing, so variation in raw stock keeping of reference calibration patches and images of scenes naturally occurs. We have found that a calibration based on data from reference calibration patches when used with predetermined aim data fails to compensate for keeping related differences.

We have also found that reference calibration patch exposures located on a photographic element in a location that differs from frames containing scene exposures, such as near the edge of a filmstrip or between perforations on a filmstrip (as opposed to the center of the filmstrip), result in different densities than those obtained by the same exposures in frame locations containing scene exposures. Additionally, we have found that differences in processing throughout the length of a photographic element also result in different densities. A calibration based on data from reference calibration patches when used with predetermined aim data fails to compensate for location related differences.

We have further found that data acquired from reference calibration patches on a variety of photographic elements using a variety of measurement devices vary. Devices such as densitometers, colorimeters, and image scanners use varying illumination, filtration, and sensor technologies that result in variations in density values reported for an area containing specific amounts of colorants from a given photographic element colorant set. Although a density measurement device may be calibrated to give a predetermined aim response for specific input media, we have found that even well-calibrated devices give different responses when presented with images on a variety of photographic elements. This problem is particularly troublesome if a different device is used to measure reference calibration patches than is used for measuring scene images, as a calibration based on data from such measurements, when used with predetermined aim data, fails to compensate for measurement device related differences.

We have found that pixel values obtained with an image scanner in a particular picture element or pixel, corresponding to a particular area on the photographic element, are often corrupted by inadvertent illumination, referred to as flare, impinging upon the scanner sensor. For example, assuming pixel values that increase with density, pixel values obtained for a small area with a low density surrounded by a large area with a higher density are higher than pixel values obtained from a large area with the same low density as the small area due to higher absorption of stray light by the surrounding area. Conversely, pixel values obtained for a small area with high density surrounded by a large area with lower density are lower than pixel values obtained from a large area with the same high density as the small area due to lower absorption of stray light by the surrounding area. In a typical scene image, local and overall density variations in the area of the photographic element being scanned tend to produce an effective surrounding density that is significantly above the minimum density and below the maximum density. Accordingly, the pixel values obtained in individual pixels of a scene image that correspond to areas with lower densities tend to be higher than they would be in a large area with a uniform low density and pixel values obtained in individual pixels of a scene image that correspond to areas with higher densities tend to be lower than they would be in a large area with a uniform high density. Unfortunately, the image content of a reference calibration target comprising a set of reference calibration patch exposures is often far from that of a typical scene. Significant areas of very low or very high density are found in such reference calibration targets that influence pixel values measured in reference calibration patches either as compared to pixel values that would be obtained either from a larger patch area or from a patch area surrounded by densities typical of a scene image. Accordingly, data obtained from reference calibration patches are corrupted in a different way than data obtained in a scene image, making a calibration based on reference calibration patches and a predetermined set of aim values inaccurate.

We have found that indiscriminate use of data from reference calibration patches containing corruption from dust, scratches, or other imperfections makes a calibration based on reference calibration patches and a predetermined set of aim values inaccurate.

There is a need therefore for an improved method of calibration that minimizes the problems noted above.

SUMMARY OF THE INVENTION

The need is met by providing a method of calibrating digital images having pixels with pixel values, which includes the steps of: exposing a photographic element to form a latent image of a reference calibration target including a plurality of reference calibration patches; exposing the photographic element to form a latent image of a scene; processing the photographic element to form developed images from the latent images on the photographic element; scanning the developed images to produce digital images; measuring the pixel values of the digital image of the reference calibration target to produce a measured value for each of the reference calibration patches; obtaining an aim value and adjustment data corresponding to each reference calibration patch; generating image calibration corrections using the measured values, the aim values, and the adjustment data; and applying the image calibration corrections to the digital image of the scene.

DETAILED DESCRIPTION OF THE INVENTION

Figure 1:
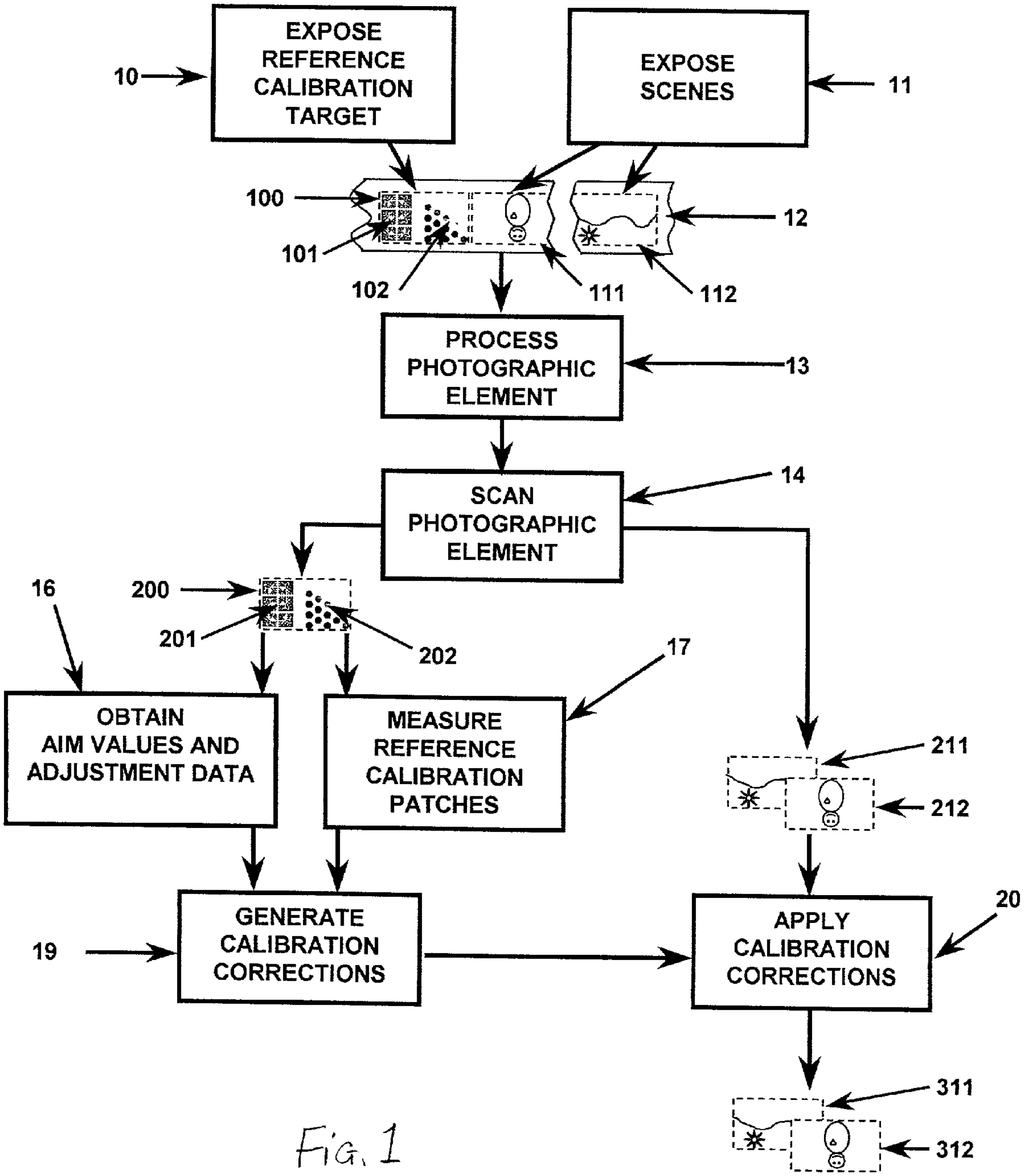
FIG. 1 is a flow chart illustrating the method of the present invention.

In the following description, a photographic element includes at least a base with a photosensitive layer that is sensitive to light to produce a developable latent image. The photosensitive layer may contain conventional silver halide chemistry, or other photosensitive materials such as thermal or pressure developable chemistries. It can have a transparent base, a reflective base, or a base with a magnetically sensitive coating. The photographic element can be processed through standard chemical processes, including but not limited to Kodak Processes C-41 and its variants, ECN-2, VNF-1, ECP-2 and its variants, D-96, D-97, E-4, E-6, K-14, R-3, and RA-2SM, or RA-4; Fuji Processes CN-16 and its variants, CR-6, CP-43FA, CP-47L, CP-48S, RP-305, RA-4RT; Agfa MSC 100/101/200 Film and Paper Processes, Agfacolor Processes 70, 71, 72 and 94, Agfachrome Processes 44NP and 63; and Konica Processes CNK-4, CPK-2-22, DP, and CRK-2, and Konica ECOJET HQA-N, HQA-F, and HQA-P Processes. The photographic element can be processed using alternate processes such as apparently dry processes that may retain some or all of the developed silver or silver halide in the element or that may include lamination and an appropriate amount of water added to swell the photographic element. Depending upon the design of the photographic element, the photographic element can also be processed using dry processes that may include thermal or high pressure treatment. The processing may also include a combination of apparently dry, dry, and traditional wet processes. Examples of suitable alternate and dry processes include the processes disclosed in: U.S. patent application Nos. 60/211,058 filed Jun. 3, 2000 by Levy et al.; 60/211,446 filed Jun. 3, 2000 by Irving et al.; 60/211,065 filed Jun. 3, 2000 by Irving et al.; 60/211,079 filed Jun. 3, 2000 by Irving et al.; EP Patent No. 0762201A1 published Mar. 12, 1997, by Ishikawa et al.; EP Patent No. 0926550A1, published Dec. 12, 1998, by Iwai, et al.; U.S. Pat. No. 5,832,328 issued Nov. 3, 1998 to Ueda; U.S. Pat. No. 5,758,223 issued May 26, 1998 to Kobayashi, et al.; U.S. Pat. No. 5,698,382 issued Dec. 16, 1997 to Nakahanada, et al.; U.S. Pat. No. 5,519,510 issued May 21, 1996 to Edgar; and U.S. Pat. No. 5,988,896 issued Nov. 23, 1999 to Edgar. It is noted that in the processes disclosed by Edgar, development and scanning of the image occur simultaneously. Accordingly, it is the intent of the present invention that any development and scanning steps can be performed simultaneously.

The reference calibration patches used in the calibration procedures according to the present invention can be neutral, colored or any combination thereof. Neutral patches are created by using approximately equal red, green and blue actinic exposures. Exposures can be delivered to the photosensitive layer of the photographic element through fiber optic media, lensed fiber optic media, laser modulation, contact exposure using an appropriate modulation mask, micro-mirror device, or other similar exposure modulation device. In a preferred embodiment of this invention, an array of reference calibration patches is formed on a photographic element using exposures delivered using a light source, an integrating chamber, and a fiber optic array with attenuating filters for determining exposure and an imaging head containing an array of lenses and field stops, each fiber exposing one reference calibration patch, as disclosed in copending U.S. Ser. No. 09/635,389, by Klees et al. entitled Apparatus For Exposing Sensitometric And Barcode Data Onto Photosensitive Media.

We have found it useful to store reference calibration data on the photographic element containing the reference calibration patches to aid in the calibration process. This data can be stored in many ways, including, but not limited to the following methods: one-dimensional barcode symbols optically printed on the photographic element; two-dimensional barcode symbols optically printed on to the photographic element; storage in magnetic layers that are part of the flexible support of the photographic element; and storage in memory that is accessed depending upon pointers stored in previously mentioned manners. In a preferred embodiment of the present invention, reference calibration data is stored in two-dimensional barcode symbols optically exposed on the photographic element. Two-dimensional barcode symbols can be rapidly applied to a photographic element using an LCD mask and flash illumination as disclosed in the above referenced copending U.S. Ser. No. 09/635,389, and reference calibration data stored therein may be readily retrieved using commercially available software to process digital images obtained from scanners that are readily available in the photofinishing trade. The two-dimensional barcode symbologies that we prefer include, but are not limited to, Data Matrix and Aztec Code.

A scanner used in this invention may be any of a plurality of well-known scanner types used in the industry. A scanner can utilize a point sensor (i.e., microdensitometer), a line array sensor or an area array sensor. The transport mechanism used to feed the photographic element into the scanner can be one or more of many types, including a manual thrusting mechanism, a cartridge thrust mechanism or a high speed continuous feed mechanism.

Referring to FIG. 1, the calibration method in a preferred embodiment of the invention includes the steps of exposing (10) a reference calibration target frame 100 to form latent images of two-dimensional barcode symbols 101 and reference calibration patches 102 on a photographic element 12. A first scene frame 111 and last scene frame 112 and other intermediate scene frames (not shown) are also exposed (11) to form latent images on the photographic element 12. After exposing the reference calibration target (10) and the images (11), the latent images in frames 100, 111 and 112 and other intermediate frames are processed (13) to form developed images.

The developed images are scanned (14), to produce a digital image 200 of the reference calibration target frame 100 and first and last digital images 211 and 212 and other intermediate digital images (not shown) of a first scene frame 111 and last scene frame 112 and other intermediate scene frames (not shown). Digital images are composed of pixels, which in turn have one or more pixel values, one value for each color channel of the digital image. In color images, there typically are three color channels (e.g. red, green, and blue) and hence three pixel values for each pixel. The scanner used to scan the developed images of the reference calibration target 100 and frames 111 and 112 is preferably the same scanner, but may be different scanners. Aim values and adjustment data are obtained (16), for example by using decoding software to extract data from the portion 201 of the digital image 200 containing the two-dimensional barcode images. In the measuring step (17), the portion 202 of the digital image 200 corresponding to the reference calibration patches is measured to produce measured values characteristic of the response of the photographic element 12, for example, mean or median pixel values. The aim values, adjustment data, and measured values are then used to generate image calibration corrections (19). Finally, the first and last digital images 211 and 212 and the other intermediate digital images (not shown) are corrected (20) using the image calibration corrections to produce a plurality of calibrated digital images 311 and 312 and other intermediate calibrated digital images (not shown) suitable for use in further image processing. To simplify the discussion of the present invention, the aim values are assumed to already be in the same color space as calibrated digital images. A color space we have found useful for manipulation of aim values uses reference densities, as measured by a reference density measurement device, as color space coordinates. If the aim values and calibrated digital images are not in the same color space, it is a simple matter to apply any transformation required to map image calibration corrections expressed in the aim value space into the calibrated image space as a final step in the generating step (19).

Figure 2:
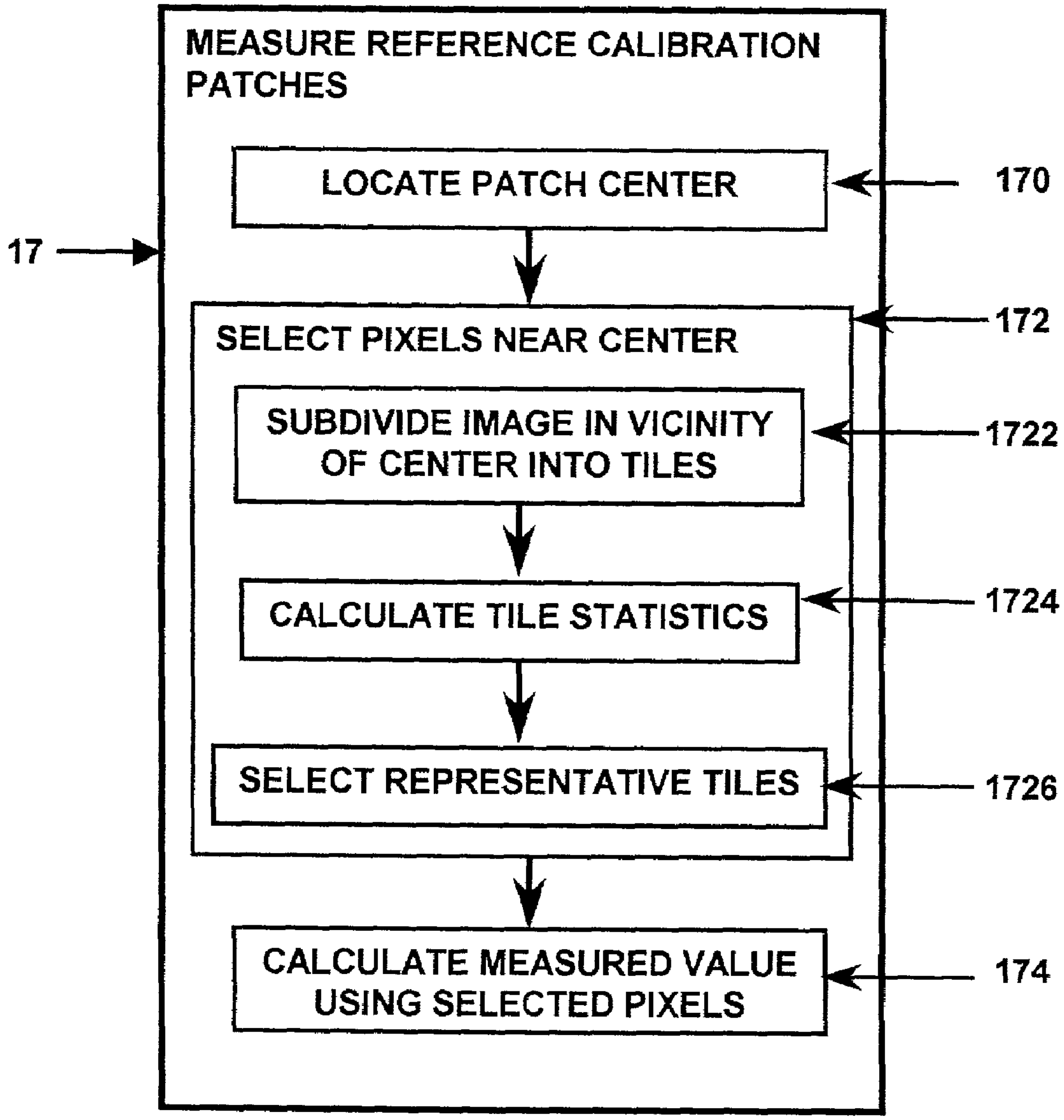
FIG. 2 is a detailed flow chart showing the step of measuring reference calibration patches.

Referring to FIG. 2, a detailed flowchart of a preferred embodiment of the measurement step (17) is shown. The locating step (170) is accomplished using knowledge of the layout of the reference calibration target, preferably using methods described in copending application U.S. Ser. No. 09/636,058, by Keech et al. entitled A Method Of Locating A Calibration Patch In A Reference Calibration Target Once a center of a reference calibration patch is located, the pixel selecting step (172) uses the center location information 10 to select pixels from the digital image 200 with pixel values characteristic of the reference calibration patch. Other information regarding the suitability of pixels may also be used in the pixel selecting step. For example, pixels associated with extended linear defects detected using methods as described in copending U.S. Ser. No. 09/635,178, by Cahill et al. entitled Location Of Extended Linear Defects are eliminated from consideration. The computing step (174) then produces a measured value from the selected pixel values.

In a preferred embodiment of the present invention, the pixel selecting step (172) includes a subdividing step (1722), a calculating step (1724), and a selecting step (1726). In the subdividing step (1722), a portion of the digital image 200 centered on the center location of the patch determined in the locating step (170) is divided into a collection of tiles, typically rectangular with each tile containing an 'm' by 'n' set of pixels, preferably with the product of 'm' and 'n' being greater than 8. In the calculating step (1724), the mean and variance statistics of the digitized pixel values of the pixels in each tile are calculated. In the selecting step (1726), tiles representative of the reference calibration patch are chosen using methods designed to remove tiles associated with defects in the digital image. For example, tiles associated with extended linear defects detected using methods as described in the aforementioned copending U.S. Ser. No. 09/635,178, can be eliminated from consideration.

We have found that tiles associated with other image defects, for examples dust, bubbles, or defective image sensor pixels, typically exhibit unusually high or low means or variances and thereby may also be eliminated from consideration. In a preferred embodiment of the present invention, statistics and statistical methods are used to identify such unusual means and variances and eliminate the associated tiles. For example, a reference calibration patch having a diameter of 1 mm on color negative photographic film scanned at a 0.018 mm pitch provides a sufficient number of pixels for the statistical method of the present invention. First, a set of central tiles is chosen, preferably 120 3 by 3 tiles closest to the center location. The median of the variances of the chosen tiles is found and used to define upper and lower acceptance limits for use in finding unusual variances. Upper and lower confidence limits, preferably $97.5^{th}$ and $2.5^{th}$ percentile respectively, and the $50^{th}$ percentile point are obtained from the well-known chi-squared distribution, parameterized by the number of degrees of freedom in each variance, 'm' times 'n' minus 1. The median value is scaled by the ratios of the upper and lower confidence limits to the $50^{th}$ percentile point to provide upper and lower acceptance limits respectively. The median of variances of tiles with variances within the range of the acceptance limits is then divided by the location of the $50^{th}$ percentile point to provide a robust estimate of the variance of the mean of pixel values in a tile.

Next, a smaller set of central tiles is chosen from those whose variances fell within the range of the acceptance values, preferably 50 3 by 3 tiles closest to the center location. The median of the means of the chosen tiles is used to provide a preliminary grand mean estimate. A t-statistic for each tile is computed by subtracting the provisional grand mean from the mean of each tile and dividing the result by the square root of the variance estimate of the mean. Upper and lower confidence limits, preferably $97.5^{th}$ and $2.5^{th}$ percentile respectively, are obtained for the well-known Student's t distribution, parameterized by the number of degrees of freedom in each t-statistic, 'm' times 'n' minus 1.

These confidence limits and t-statistic values are used in the representative tile selecting step (1726). Tiles with t-statistic values within the range of the confidence limits are selected as representative tiles. Once representative tiles are selected, the pixels within the tiles are selected, completing the pixel selecting step (172). In the calculating step (174), the mean of the pixel values of the selected pixels is computed to produce a measured value characteristic of the response of the photographic element at the exposure of the reference calibration patch. By using such artifact removal methods, inaccuracies in calibration due to indiscriminate use of data from reference calibration patches containing corruption from dust, scratches, or other imperfections are significantly reduced.

It is well known that a scanner device may be calibrated to give a predetermined aim response for specific input media. We have found that even well-calibrated scanner devices give different responses when presented with images on a variety of photographic elements. A relationship between pixel values as measured by a reference density measurement device and pixel values measured by a specific scanner device when used to scan images on a particular photographic element type is used to derive predetermined device adjustment data that are stored in memory. In the generating step (19), such device adjustment data are applied to measured values produced in the measurement step (17) to provide device independent calibration corrections. To use device independent calibration corrections to calibrate digital images, device adjustment data, potentially for a different device, must also be applied to scene digital image pixel values. Although this device adjustment data may be applied to scene digital image pixel values as a separate image calibration correction in the applying step (20) before applying device independent image calibration corrections, efficiency is enhanced by cascading the effects of device dependent adjustments with the device independent calibration corrections to generate device dependent calibration corrections for use in step (20). By application of these device adjustment aspects of the present invention, a high quality calibration of the photographic element is achieved and efficiently implemented without requiring use of a reference density measurement device.

We have found that in some scanners, data obtained from reference calibration patches in a digital image containing significant areas of low density are corrupted by stray light. The amount of adjustment required to remove the corruption is characteristic of the scanner but also depends on the density characteristics of the scanned photographic element. In particular, a flare adjustment model we have found useful in conjunction with measured values that have been expressed in reference density has the form of the following equation:

$$D_{adj}=D_{mm}-\log_{10}(10^{-(D-D_{min})}-10^{-\Delta D_{max}}) \qquad \text{Eq. 1}$$

In this equation, $D_{adj}$ is an adjusted reference density, $D_{min}$ is a minimum reference density of the photographic element, D is a measured reference density, and $\Delta D_{max}$ is a predetermined value characteristic of the flare of the scanner and the overall content of a reference calibration target. We have found that application of the flare adjustment model shown in Eq. 1 to a reference density value obtained from a measured value after device adjustment provides a flare adjustment that effectively removes the corruptive influence of stray light.

In the prior art, predetermined aim density values for reference calibration patches corresponding to predetermined aim exposures are used in generating image calibration corrections. In the present invention, instead of requiring exacting exposure control to produce accurately exposed reference calibration patches 102 on the photographic element 12, we compute modified aim density values from the predetermined aim exposure and density values and actual exposures used to record the reference calibration patches. The modified aim density values, or data sufficient to compute them, are stored in memory, so that the modified aim density values are available when needed for calibration of the photographic element. For example, both predetermined aim density values and aim density adjustments can be stored in memory to compute the modified aim density values when needed for calibration of the photographic element. In the preferred embodiment, the modified aim density values are encoded in the two-dimensional barcode latent images 101. By use of the above described exposure adjustment aspect of the present invention, a high quality calibration of the photographic element is achieved without requiring exacting exposure control to produce essentially identical exposures on all reference calibration patch exposing devices.

By providing a predetermined set of aim density values, the prior art of reference patch calibration of photographic elements assumes that raw stock and latent image keeping changes in the photographic element occurring during a time differential between the times when reference calibration frame and scene frames are exposed on the photographic element are negligible. Depending on the formulation of the photographic element, a critical time differential over which such keeping effects are negligible varies. For color negative film, the critical time differential is typically about two weeks. Exposures could be made just prior to scene exposures, within the critical time differential, just subsequent to scene exposures, again within the critical time differential, or even contemporaneously without requiring additional adjustments for keeping.

By providing a predetermined set of aim density values, the prior art of reference patch calibration of photographic elements also assumes that latent image keeping changes in the photographic element occurring during time differentials between various exposures and processing are negligible. Again, depending on the formulation of the photographic element, a critical time differential over which such latent keeping effects are negligible varies. For color negative film, we have found that the critical time differential for long term latent image keeping is typically two weeks and the critical time differential for short term latent image keeping is typically twenty minutes. Exposures that are made with a time differential between exposure and processing shorter than the long term latent image keeping critical time differential and longer than the short term latent image keeping critical time differential, referred to as promptly processed, do not require adjustment for latent image keeping differences.

Figure 3:
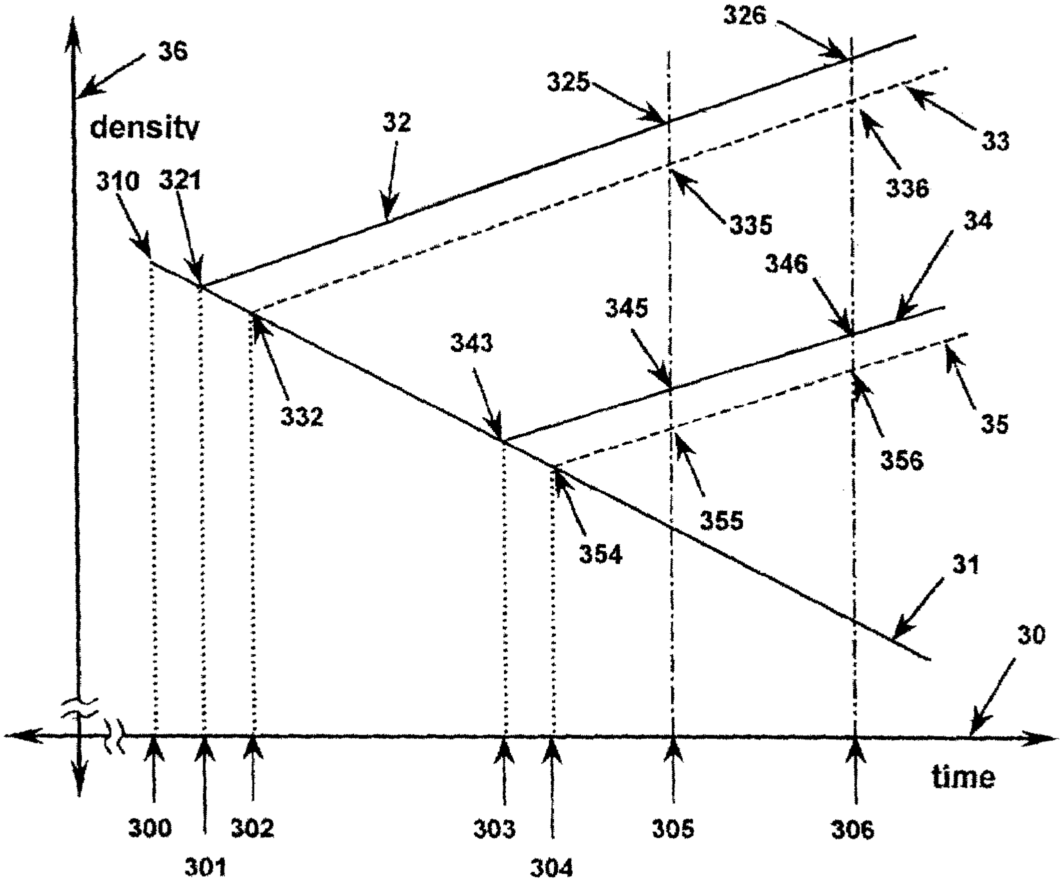
FIG. 3 is plot useful in describing the phenomenon of keeping.

In cases wherein the above cited keeping effects are not negligible, adjustments may be made using information about keeping behavior of photographic elements. Referring now to FIG. 3, a plot is shown that illustrates possible keeping histories associated with a particular exposure in terms of densities along a density axis 36 at various times along a time axis 30. The raw stock keeping curve 31 represents the density that would be measured for a properly stored photographic element that is exposed and promptly processed in a nominal process at a given processing time. The latent image keeping curves 32, 33, 34 and 35 represent the density that would be measured for a properly stored photographic element exposed at various times after manufacturing and before processing in a nominal process at a given processing time.

In this plot, the photographic element is manufactured at a time 300 and the raw stock keeping curve 31 starts at a density as indicated at point 310, reaching the points 321, 332, 343, and 354 at times 301, 302, 303 and 304 respectively. The first latent image keeping curve 32 starts when the photographic element is exposed at time 301 at the point 321 and reaches the points 325 and 326 when later processed at times 305 and 306 respectively. The second latent image keeping curve 33 starts when the photographic element is exposed at time 302 at the point 332 and reaches the points 335 and 336 when later processed at times 305 and 306 respectively. The third latent image keeping curve 34 starts when the photographic element is exposed at time 303 at the point 343 and reaches the points 345 and 346 when later processed at times 305 and 306 respectively. The fourth latent image keeping curve 35 starts when the photographic element is exposed at time 304 at the point 354 and reaches the points 355 and 356 when later processed at times 305 and 306 respectively.

When defining a predetermined aim density performance at a particular exposure, it is convenient to incorporate a nominal keeping history. For example, an aim scene density obtained by following curves 31 and 34 is achieved at the point 345, which represents a photographic element manufactured at time 300, exposed with a scene at time 303, and processed at time 305. An aim reference calibration patch density for this particular exposure obtained by following curves 31 and 32 is achieved at the point 325, which represents a photographic element manufactured at time 300, exposed with a reference calibration patch exposure at time 301, and processed at time 305. The fixed offset between the densities achieved at the points 325 and 345 accounts for the differences in the raw stock and latent image keeping times between reference calibration patch exposure and scene exposure. Such an offset is used as a keeping adjustment to convert a predetermined aim density from an aim scene density into an aim reference calibration patch density.

The actual keeping history of a particular photographic element will in general differ from a nominal history. For example, a photographic element manufactured at time 300, exposed with a reference calibration patch at time 302, and processed at time 306 in a nominal process achieves the density at the point 336. The offset between the density at the point 336 and the point 325 is the keeping adjustment that properly accounts for differences between the actual keeping history and the nominal keeping history of the reference calibration patch assumed in a predetermined aim reference calibration patch density.

More generally, we have found that we can model density responses to keeping history differences from a nominal keeping history to derive keeping adjustments for keeping time differentials that result in non-negligible density differences. Such models describe changes in density at a plurality of predetermined exposures as a function of time. The parameters of such models may include offsets at predetermined times and exposures, time sensitivities at varying exposures, and parameters of time transient coefficient functions. We have found that models of the following form are useful:

$$f(t,E)=g_0(E;t_1,t_2,t_3)+f(t)g_1(E)+f_2(t)g_2(E) \quad \text{Eq. 2}$$

In Eq. 2, the first function $g_0$ represents an exposure dependent offset between density from exposures made at a first predetermined raw stock keeping time $t_1$ after manufacturing (for example the time differential between times 301 and 300), and density from exposures made at a second predetermined raw stock keeping time $t_2$ after manufacturing (for example the time differential between times 303 and 300), when the latent images from these exposures are processed at a third predetermined processing time $t_3$ after manufacturing (for example the time differential between times 305 and 300), with said times after manufacturing being typical of those seen in the use of the photographic element. For the times in the three examples noted above, the first term represents the density difference between points 345 and 325 in FIG. 3. A second term in Eq. 2, comprising a time transient function $f_1$ and time sensitivity function of exposure $g_1$, represents changes in density seen at a processing time t due to a raw stock keeping time that differs from the first predetermined raw stock keeping time $t_1$. A third term in Eq. 2, comprising a time transient function $f_2$ and time sensitivity function of exposure $g_2$, represents changes in density due to a latent image keeping time that differs from the predetermined latent image keeping time $t_3-t_1$.

For example, consider the keeping history along curves 31 and 32. In this example, the raw stock keeping time from time 300 to time 301 is nominal, so the adjustment computed by the second term in Eq. 2 is zero at all processing times t. When evaluated at time 306, the third term is nonzero, representing the density difference between points 325 and 326. In another example, consider the keeping history along curves 31 and 33 in which the raw stock keeping time from time 300 to time 302 is no longer nominal, so the adjustment computed by the second term is not identically zero. Further, by changing the exposure time from time 301 to time 302, the latent image keeping time from time 302 to the processing time t also differs from the latent image keeping time between time 301 and the processing time t, so an adjustment computed by the third term is also required. For a processing time t at time 305, the cumulative adjustment calculated using the second and third terms in Eq. 2 represents the density difference between points 325 and 335. For a processing time t at time 306, the cumulative adjustment calculated using the second and third terms now represents the density difference between points 325 and 336. By using all three terms as shown in Eq. 2, predetermined aim densities appropriate for a nominal scene image keeping history following curves 31 and 34 and terminating at the point 345 can be converted to aim densities appropriate for an actual keeping history of a reference calibration exposure following curves 31 and 33 terminating at the point 336, thus adjusting for any differences in the keeping times of a particular reference calibration patch. By use of the above described aim keeping adjustment aspect of the present invention, a high quality calibration of the photographic element is achieved using keeping adjustments that properly compensate for keeping related differences in densities of reference calibration patches.

In the present invention, keeping adjustment data such as pre-computed keeping adjustments or data required to compute keeping adjustments (such as model parameters, nominal times of manufacturing, reference calibration exposure, and processing and actual times of manufacturing and reference calibration exposure) are stored in memory for use when needed for calibration of the photographic element. In a preferred embodiment of the present invention, keeping adjustment data are encoded in the two-dimensional barcode latent images 101. By use of the above described aim keeping adjustment aspect of the present invention, a high quality calibration of the photographic element is achieved whether the reference calibration exposures are made before images are exposed onto the photographic element, such as in manufacturing processes or in a separate process in a retail outlet or at home, or after images are exposed onto the photographic element, such as in photofinishing operations or in a separate process in a retail outlet or at home.

We have found that keeping adjustments appropriate to correct for differences in keeping histories experienced by scene images (for example, as in scene frames 111 and 112 shown in FIG. 1) on a photographic element can likewise be computed using a model of the form of Eq. 2 in which the first term is zero, the second term represents the raw stock keeping difference between an actual scene exposure made at an actual time and a scene exposure made at a nominal time, and the third term represents the latent image keeping difference between the scene exposure made and processed at actual times and a scene exposure made and processed at nominal times. For example, a scene exposure made at time 303 and processed at time 306 rather than time 305 has the density of point 346 rather than point 345. In a second example, a scene exposure made at time 304 rather than time 303 and processed at time 305 has the density of point 355 rather than point 345. In a third example, a scene exposure made at time 304 rather than 303 and processed at time 306 rather than time 305 has the density of point 356 rather than point 345. By calculating corrections for scene specific keeping differences using such a model, scene digital images can be calibrated back to a nominal keeping history. By use of the above described scene keeping adjustment aspect of the present invention, a high quality calibration of the photographic element is achieved using scene specific calibration corrections that properly compensate for keeping related differences in densities of scene images.

The prior art around the concept of reference patch calibration of photographic elements also assumes that the response of the photographic element to exposure, processing, and scanning are similar regardless of the relative locations on the photographic element of reference calibration patches and scene frames. Quite often the prior art recommends that reference patches be located near the edges of the photographic element, because of space limitations. Photoprocessing activity can differ considerably between the middle and edges of the photographic element. In a preferred embodiment, such as disclosed in copending U.S. Ser. No. 09/635,496, by Keech et al. entitled Photographic Element With Reference Calibration Data, reference calibration patches are exposed near the center of the photographic element, in a position similar to frames in which the scene images are exposed. However, even given a similar location relative to the edges of the photographic element, in some processes, photoprocessing activity can also vary significantly along the length of a photographic element, again leading to a positional difference in response varying with the relative location on the photographic element of reference calibration patch and image frames.

We have found that we can model the difference in response between one region on the photographic element where the reference calibration patches are exposed and the frames where scenes are exposed. The offsets, dimensional factors or any combination thereof expressing the changes in film response with location on the photographic element are stored as adjustment data in memory, so that they are available for generating image calibration corrections. In a preferred embodiment of the present invention, these reference calibration patch and scene location adjustment data are encoded in the two-dimensional barcode latent images 101. By use of the above described reference calibration patch and frame specific location adjustment aspects of the present invention to adjust reference calibration patch aim values or make frame specific calibration corrections of digital images of scenes, a high quality calibration of the photographic element is achieved even when a positional difference in photographic element response exists.

Figure 4:
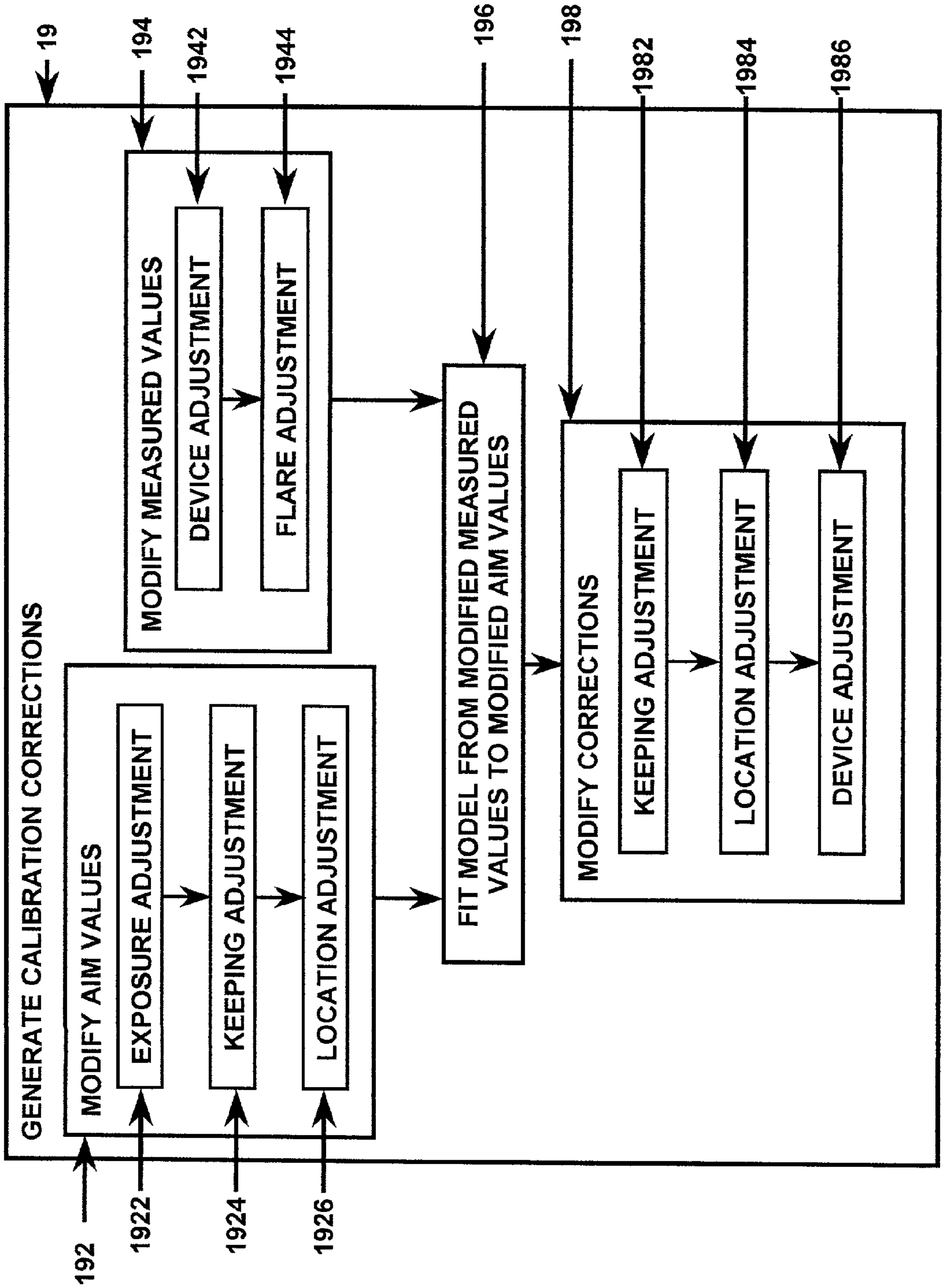
FIG. 4 is a detailed flow chart showing the step of generating calibration corrections.

Referring to FIG. 4, a detailed flowchart of a preferred embodiment of the calibration correction generating step (19) is shown. The aim value modifying step (192) includes an exposure adjustment step (1922), a keeping adjustment step (1924), and a location adjustment step (1926). The exposure adjustment step (1922) implements the exposure adjustment aspect of the present invention wherein a first aim density adjustment to a predetermined aim value of density corresponding to a predetermined aim value of exposure, both predetermined aim values obtained in the obtaining step (18), is computed for each reference calibration patch according to an actual value of exposure used in the reference calibration patch exposing device, with the actual exposure value also obtained in the obtaining step (18). The keeping adjustment step (1924) implements the aim keeping adjustment aspect of the present invention wherein actual times of manufacturing, reference calibration patch exposure, and processing, together with keeping model parameters, all obtained in the obtaining step (18), are used to compute a second aim density adjustment to account for differences between nominal raw stock and latent image keeping times and actual raw stock and latent image keeping times. The location adjustment step (1926) implements the reference calibration patch location adjustment aspect of the present invention wherein offsets, dimensional factors or any combination thereof expressing the changes in film response with location on the photographic element, all obtained in the obtaining step (18), are used to compute a third aim density adjustment. The aim value modifying step (192) is completed by accumulating the first, second, and third aim density adjustments and adding the result to the predetermined aim density values obtained in the obtaining step (18) to produce modified aim values.

The measured value modifying step (194) includes a device adjustment step (1942) and a flare adjustment step (1944). The device adjustment step (1942) implements the device adjustment aspect of the present invention wherein a first measured value adjustment is computed using measured mean pixel values of each reference calibration patch and device adjustment parameters obtained in obtaining step (18). The flare adjustment step (1944) implements the flare adjustment aspect of the present invention wherein a second measured value adjustment is computed using measured values, as modified using adjustments from the device adjustment step (1942), of each reference calibration patch and of a minimum density reference calibration patch, and flare model parameters obtained in obtaining step (18). The measured value modifying step (194) is completed by accumulating the effects of the first and second measured value adjustments on the measured density values obtained in the measuring step (17) to produce modified measured values.

The fitting step (196) uses a least-squares method to fit a model which relates modified aim values from the aim value modifying step (192) to modified measured values from the measured value modifying step (194) that is used to generate device independent image calibration correction values. In a preferred embodiment of the present invention, the model takes the form of a one-dimensional lookup table, referred to as a 1D LUT, for each color channel present in the digital image. It should be noted that other model forms, such as 1D LUTs in combination with low-order polynomial models or higher dimensional lookup tables, are anticipated in the present invention.

The correction modifying step (198) includes a keeping adjustment step (1982), a location adjustment step (1984), and a device adjustment step (1986). The keeping adjustment step (1982) implements the scene keeping adjustment aspect of the present invention wherein actual times of manufacturing, scene exposure, and processing, together with keeping model parameters, all obtained in the obtaining step (18), are used to compute a scene specific keeping correction adjustment to account for differences between nominal raw stock and latent image keeping times and actual raw stock and latent image keeping times. The location adjustment step (1984) implements the location adjustment aspect of the present invention wherein location adjustment data (for example, offsets, dimensional factors or any combination thereof) expressing the variation in film response as a function of latent image location on the photographic element, all obtained in the obtaining step (18), are used to compute a frame specific location correction adjustment. The device adjustment step (1986) implements the device adjustment aspect of the present invention wherein a device correction adjustment is computed using device adjustment parameters obtained in obtaining step (18). As noted above, although the various calibration correction adjustments may be applied separately in the applying step (20), efficiency is enhanced by cascading the effects of device adjustment from step (1986), the device independent calibration corrections from step (196), and the cumulative effect of frame dependent keeping and location correction adjustments from steps (1982) and (1984) to generate frame and device specific calibration corrections for use in step (20).

The invention has been described in detail with particular reference to certain preferred embodiments thereof, but it will be understood that variations and modifications can be effected within the spirit and scope of the invention.

What is claimed is:

1. A method of calibrating digital images having pixels with pixel values, comprising the steps of:

a) exposing a photographic element to form a latent image of a reference calibration target including a plurality of reference calibration patches;

b) exposing the photographic element to form a latent image of a scene;

c) processing the photographic element to form developed images from the latent images on the photographic element;

d) scanning the developed images to produce digital images;

e) measuring the pixel values of the digital image of the reference calibration target to produce a measured value for each of the reference calibration patches;

f) obtaining an aim value and adjustment data corresponding to each reference calibration patch;

g) generating image calibration corrections using the measured values, the aim values, and the adjustment data; and h) applying the image calibration corrections to the digital image of the scene.

2. The method claimed in claim 1, wherein the reference calibration target exposing step is performed during a step in manufacture of the photographic element.

3. The method claimed in claim 1, wherein the reference calibration target exposing step is performed just prior to the processing step, whereby latent image keeping effects of the reference calibration patches can be ignored.

4. The method claimed in claim 1, wherein the reference calibration target exposing step is performed just prior to the scene exposing step, whereby keeping differences between reference calibration patches and the scene image can be ignored.

5. The method claimed in claim 1, wherein the reference calibration target exposing step is performed just subsequent to the scene exposing step, whereby keeping differences between reference calibration patches and the scene image can be ignored.

6. The method claimed in claim 1, wherein the photographic element is a film strip.

7. The method claimed in claim 1, wherein the processing step employs a standard photographic process.

8. The method claimed in claim 1, wherein the processing step employs an alternate photographic process.

9. The method claimed in claim 1, wherein the processing step employs a dry photographic process.

10. The method claimed in claim 9, wherein the dry photographic process includes thermal treatment.

11. The method claimed in claim 9, wherein the dry photographic process includes high-pressure treatment.

12. The method claimed in claim 1, wherein the scanning step employs an area array sensor.

13. The method claimed in claim 1, wherein the scanning step employs a linear array sensor.

14. The method claimed in claim 1, wherein the scanning step employs a point sensor.

15. The method claimed in claim 1, wherein the measured values comprise mean pixel values.

16. The method claimed in claim 1, wherein the step of obtaining aim values includes the step of using a pointer recorded on the photographic element to retrieve the aim values from an external memory.

17. The method claimed in claim 16, wherein the pointer is recorded on a magnetic layer on a base of the photographic element.

18. The method claimed in claim 16, wherein the pointer is recorded in a one-dimensional barcode symbol exposed as a latent image in a photosensitive layer of the photographic element.

19. The method claimed in claim 18, wherein the photographic element is an APS film strip and the one-dimensional barcode symbol is a lot number recorded on the film strip.

20. The method claimed in claim 16, wherein the pointer is recorded in a two-dimensional barcode symbol exposed as a latent image in a photosensitive layer of the photographic element.

21. The method claimed in claim 20, wherein the reference calibration target includes the two-dimensional barcode symbol.

22. The method claimed in claim 1, wherein the aim values are recorded on the photographic element.

23. The method claimed in claim 22, wherein the aim values are recorded in a magnetic layer on a base of the photographic element.

24. The method claimed in claim 22, wherein the aim values are recorded in a one-dimensional barcode symbol exposed as a latent image in a photosensitive layer of the photographic element.

25. The method claimed in claim 22, wherein the aim values are recorded in a two-dimensional barcode symbol exposed as a latent image in a photosensitive layer of the photographic element.

26. The method claimed in claim 25, wherein the reference calibration target includes the two-dimensional barcode symbol.

27. The method claimed in claim 1, wherein the step of obtaining adjustment data includes the step of using a pointer recorded on the photographic element to retrieve the adjustment data from an external memory.

28. The method claimed in claim 27, wherein the pointer is recorded on a magnetic layer on a base of the photographic element.

29. The method claimed in claim 27, wherein the pointer is recorded in a one-dimensional barcode symbol exposed as a latent image in a photosensitive layer of the photographic element.

30. The method claimed in claim 29, wherein the photographic element is an APS film strip and the one-dimensional barcode symbol is a lot number recorded on the film strip.

31. The method claimed in claim 27, wherein the pointer is recorded in a two-dimensional barcode symbol exposed as a latent image in a photosensitive layer of the photographic element.

32. The method claimed in claim 31, wherein the reference calibration target includes the two-dimensional barcode symbol.

33. The method claimed in claim 1, wherein the adjustment data are recorded on the photographic element.

34. The method claimed in claim 33, wherein the adjustment data are recorded in a magnetic layer on a base of the photographic element.

35. The method claimed in claim 33, wherein the adjustment data are recorded in a one-dimensional barcode symbol exposed as a latent image in a photosensitive layer of the photographic element.

36. The method claimed in claim 33, wherein the adjustment data are recorded in a two-dimensional barcode symbol exposed as a latent image in a photosensitive layer of the photographic element.

37. The method claimed in claim 36, wherein the reference calibration target includes the two-dimensional barcode symbol.

38. The method claimed in claim 1, wherein the step of measuring the pixel values of the digital image of the reference calibration target to produce a measured value for each of the reference calibration patches includes the steps of:

a) locating the center of a reference calibration patch in the digital image;

b) selecting pixels from the digital image representative of the reference calibration patch using the center location; and c) computing the measured value using the selected pixels.

39. The method claimed in claim 38, wherein the step of selecting pixels includes the steps of a) locating extended linear defects in the digital image; and b) eliminating pixels contained in the extended linear defects.

40. The method claimed in claim 39, wherein the step of selecting pixels includes the steps of a) subdividing the digital image of the reference calibration patch into tiles, each containing a plurality of pixels;

b) calculating statistics of pixel values in each of the tiles;

c) using the statistics to eliminate tiles containing defects; and d) selecting the pixels contained in the tiles not eliminated.

41. The method claimed in claim 39, wherein the step of selecting pixels includes the steps of a) subdividing the calibration patch into tiles, each containing a plurality of pixels;

b) locating extended linear defects in the digital image;

c) eliminating tiles having extended linear defects; and d) selecting the pixels contained in the tiles not eliminated.

42. The method claimed in claim 1, wherein the adjustment data includes an adjustment for an exposure variation of a reference calibration patch.

43. The method claimed in claim 42, wherein the generating step applies the exposure adjustment data to modify the aim values.

44. The method claimed in claim 1, wherein the adjustment data includes an adjustment for a location on the photographic element of the latent image of the reference calibration patch.

45. The method claimed in claim 44, wherein the generating step applies the location adjustment data to modify the aim values.

46. The method claimed in claim 1, wherein the adjustment data includes an adjustment for a keeping variation of the latent image of the reference calibration patch.

47. The method claimed in claim 46, wherein the generating step applies the keeping adjustment data to modify the aim values.

48. The method claimed in claim 1, wherein the adjustment data includes an adjustment for a flare induced variation in the measured value of a reference calibration patch.

49. The method claimed in claim 48, wherein the generating step applies the flare adjustment data to modify the measured value.

50. The method claimed in claim 1, wherein the adjustment data includes an adjustment for a device variation in a scanning device employed in the scanning step.

51. The method claimed in claim 50, wherein the generating step applies the device adjustment data to modify the measured value.

52. The method claimed in claim 50, wherein the generating step applies the device adjustment data to modify the image calibration corrections.

53. The method claimed in claim 1, wherein the adjustment data includes an adjustment for a keeping variation of the latent image of the scene.

54. The method claimed in claim 53, wherein the generating step applies the keeping adjustment data to modify the image calibration corrections.

55. The method claimed in claim 1, wherein the adjustment data includes an adjustment for a location on the photographic element of the latent image of the scene.

56. The method claimed in claim 55, wherein the generating step applies the location adjustment data to modify the image calibration corrections.

57. The method claimed in claim 1, wherein the generating step includes the steps of:

a) modifying the aim values using the adjustment data;
b) modifying the measured values using the adjustment data;
c) fitting a model that relates the modified aim values to the modified measured values; and
d) generating the image calibration corrections using the model.

58. The method claimed in claim 1, wherein the generating step includes the steps of:

a) modifying the aim values using the adjustment data;
b) modifying the measured values using the adjustment data;
c) fitting a model that relates the modified aim values to the modified measured values;
d) generating the image calibration corrections using the model; and
e) modifying the image calibration corrections using the adjustment data to produce scene specific image calibration corrections.

59. A photographic element, comprising a) a base;
b) a photosensitive layer on the base;
c) information related to aim values and adjustment data recorded on the photographic element; and
d) a latent image of reference calibration patches recorded in the photosensitive layer wherein the information related to aim values is a pointer to aim values stored in an external memory.

60. The photographic element claimed in claim 59, wherein the photographic element is a film strip.

61. The photographic element claimed in claim 59, wherein the photosensitive layer contains conventional silver halide chemistry.

62. The photographic element claimed in claim 59, wherein the photosensitive layer contains thermal developable chemistry.

63. The photographic element claimed in claim 59, wherein the photosensitive layer contains pressure developable chemistry.

64. The photographic element claimed in claim 59, wherein the base has a magnetically sensitized coating and the pointer is magnetically recorded therein.

65. The photographic element claimed in claim 59, wherein the pointer is recorded in a one-dimensional barcode symbol exposed as a latent image in a photosensitive layer of the photographic element.

66. The photographic element claimed in claim 65, wherein the photographic element is an APS film strip and the one-dimensional barcode symbol is a lot number recorded on the film strip.

67. The photographic element claimed in claim 59, wherein the pointer is recorded in a two-dimensional barcode symbol exposed as a latent image in a photosensitive layer of the photographic element.

68. The photographic element claimed in claim 66, wherein the two-dimensional barcode symbol is included in a reference calibration target that includes the reference calibration patches.

69. The photographic element claimed in claim 59, wherein the information related to aim values are the aim values.

70. The photographic element claimed in claim 69, wherein the base has a magnetically sensitized coating and the aim values are magnetically recorded therein.

71. The photographic element claimed in claim 69, wherein the aim values are recorded in a one-dimensional barcode symbol exposed as a latent image in the photosensitive layer of the photographic element.

72. The photographic element claimed in claim 69, wherein the aim values are recorded in a two-dimensional barcode symbol exposed as a latent image in the photosensitive layer of the photographic element.

73. The photographic element claimed in claim 69, wherein the two-dimensional barcode symbol is included in a reference calibration target that includes the reference calibration patches.

74. The photographic element claimed in claim 59, wherein the information related to adjustment data is a pointer to adjustment data stored in an external memory.

75. The photographic element claimed in claim 74, wherein the base has a magnetically sensitized coating and the pointer is magnetically recorded therein.

76. The photographic element claimed in claim 74, wherein the pointer is recorded in a one-dimensional barcode symbol exposed as a latent image in a photosensitive layer of the photographic element.

77. The method claimed in claim 76, wherein the photographic element is an APS film strip and the one-dimensional barcode symbol is a lot number recorded on the film strip.

78. The photographic element claimed in claim 74, wherein the pointer is recorded in a two-dimensional barcode symbol exposed as a latent image in a photosensitive layer of the photographic element.

79. The photographic element claimed in claim 78, wherein the two-dimensional barcode symbol is included in a reference calibration target that includes the reference calibration patches.

80. The photographic element claimed in claim 59, wherein the information related to adjustment data is the adjustment data.

81. The photographic element claimed in claim 80, wherein the base has a magnetically sensitized coating and the adjustment data is magnetically recorded therein.

82. The photographic element claimed in claim 80, wherein the adjustment data is recorded in a one-dimensional barcode symbol exposed as a latent image in a photosensitive layer of the photographic element.

83. The photographic element claimed in claim 80, wherein the adjustment data is recorded in a two-dimensional barcode symbol exposed as a latent image in a photosensitive layer of the photographic element.

84. The photographic element claimed in claim 83, wherein the two-dimensional barcode symbol is included in a reference calibration target that includes the reference calibration patches.

85. A photographic element, comprising a) a base;

b) a photosensitive layer on the base;

c) information related to aim values and adjustment data recorded on the photographic element; and d) a latent image of reference calibration patches recorded in the photosensitive layer wherein the information related to adjustment data is a pointer to adjustment data stored in an external memory.

86. The photographic element claimed in claim 85, wherein the base has a magnetically sensitized coating and the pointer is magnetically recorded therein.

87. The photographic element claimed in claim 86 wherein the information related to aim values is a pointer to aim values stored in an external memory.

88. The photographic element claimed in claim 86, wherein the pointer is recorded in a one-dimensional barcode symbol exposed as a latent image in a photosensitive layer of the photographic element.

89. The photographic element claimed in claim 87, wherein the photographic element is an APS film strip and the one-dimensional barcode symbol is a lot number recorded on the film strip.

90. The photographic element claimed in claim 86, wherein the pointer is recorded in a two-dimensional barcode symbol exposed as a latent image in a photosensitive layer of the photographic element.

91. The photographic element claimed in claim 88, wherein the two-dimensional barcode symbol is included in a reference calibration target that includes the reference calibration patches.

92. The photographic element claimed in claim 85, wherein the information related to aim values are the aim values.

93. The photographic element claimed in claim 92, wherein the base has a magnetically sensitized coating and the aim values are magnetically recorded therein.

94. The photographic element claimed in claim 85, wherein the base has a magnetically sensitized coating and the pointer is magnetically recorded therein.

95. The photographic element claimed in claim 85, wherein the pointer is recorded in a one-dimensional barcode symbol exposed as a latent image in a photosensitive layer of the photographic element.

96. The method claimed in claim 95, wherein the photographic element is an APS film strip and the one-dimensional barcode symbol is a lot number recorded on the film strip.

97. The photographic element claimed in claim 85, wherein the pointer is recorded in a two-dimensional barcode symbol exposed as a latent image in a photosensitive layer of the photographic element.

98. The photographic element claimed in claim 97, wherein the two-dimensional barcode symbol is included in a reference calibration target that includes the reference calibration patches.

99. The photographic element claimed in claim 85, wherein the information related to adjustment data is the adjustment data.

100. The photographic element claimed in claim 99, wherein the base has a magnetically sensitized coating and the adjustment data is magnetically recorded therein.

* * * * *